US012434999B2

(12) United States Patent
Mazzio

(10) Patent No.: US 12,434,999 B2
(45) Date of Patent: Oct. 7, 2025

(54) SYSTEM AND METHOD FOR REMOVING DEFECTS FROM GLASS MATERIALS WITH LASER IRRADIATION

(71) Applicant: Communications Test Design, Inc., West Chester, PA (US)

(72) Inventor: Victor F. Mazzio, West Chester, PA (US)

(73) Assignee: Communications Test Design, Inc., West Chester, PA (US)

( * ) Notice: Subject to any disclaimer, the term of this patent is extended or adjusted under 35 U.S.C. 154(b) by 406 days.

(21) Appl. No.: 18/055,466

(22) Filed: Nov. 15, 2022

(65) Prior Publication Data

US 2024/0158295 A1 May 16, 2024

(51) Int. Cl.
| | |
|---|---|
| *C03C 23/00* | (2006.01) |
| *B23K 26/06* | (2014.01) |
| *B23K 26/08* | (2014.01) |
| B23K 103/00 | (2006.01) |

(52) U.S. Cl.
CPC ...... *C03C 23/0025* (2013.01); *B23K 26/0626* (2013.01); *B23K 26/083* (2013.01); *B23K 2103/54* (2018.08)

(58) Field of Classification Search
None
See application file for complete search history.

(56) References Cited

U.S. PATENT DOCUMENTS

| 4,731,254 A | 3/1988 | Heineken et al. |
| 5,283,794 A | 2/1994 | Gibbs et al. |
| 6,809,291 B1 | 10/2004 | Neil et al. |
| 2008/0202167 A1* | 8/2008 | Cavallaro ............. C03B 25/025 219/121.68 |
| 2009/0261082 A1* | 10/2009 | Wagner ................... C03C 15/00 219/121.68 |
| 2011/0259860 A1 | 10/2011 | Bass et al. |
| 2014/0167327 A1 | 6/2014 | Bhatnagar et al. |
| 2020/0254569 A1 | 8/2020 | Li et al. |

OTHER PUBLICATIONS

Shen, et al., "Mathematical modeling of laser induced heating and melting in solids", Optics & Laser Technology, 33, 2001, 533-537.
Xie, et al., "Mathematical modeling of melting during laser materials processing", Journal of Applied Physics 81, 1997, 3015-3022.
International Search Report and Written Opinion for corresponding PCT International Application No. PCT/US2023/074038 dated Feb. 22, 2024, 9 pages.
Veiko, et al., "3D express crystallization of Foturan (TM) glass at CO2 laser annealing on defects produced by picosecond laser." Fundamentals of Laser-Assisted Micro-and Nanotechnologies, 2013, vol. 9065, 8 pages.
International Search Report Issued for corresponding PCT Application No. PCT/US2023/074038 dated May 22, 2025.
"3D express crystallization of Foturan™ glass at CO2 laser annealing on defects produced by picosecond laser" by Veiko et al, Nov. 2013.

* cited by examiner

*Primary Examiner* — Queenie S Dehghan
(74) *Attorney, Agent, or Firm* — Bradley M. Brown

(57) ABSTRACT

A system to remove defects from a glass article incudes a laser that outputs a fan-shaped infrared beam; and a mechanism to move the glass article relative to the laser while the laser irradiates the glass article and melts a portion of the glass article irradiated by the laser.

9 Claims, 5 Drawing Sheets

SYSTEM AND METHOD FOR REMOVING DEFECTS FROM GLASS MATERIALS WITH LASER IRRADIATION

BACKGROUND

The present disclosure relates to removing physical defects from glass surfaces. More specifically, the present disclosure relates to removing physical defects from glass surfaces using a laser.

A complaint that consumers have is broken or damaged coverglass or electronic displays on their mobile devices such as a smartphone, smartwatch, or a tablet. The electronic display is conventionally either a liquid crystal display (LCD) or an organic light-emitting display (OLED). For example, it is not uncommon for owners to have dropped their mobile device or otherwise damaged the front glass surface. These defects can cause visual impairment or interfere with the ability to quickly and accurately read information on the display.

With the increasing usage of network services all over the world, these mobile devices are in great demand. As a result, the cost of returned, used, and refurbished mobile devices have increased. While evaluating used mobile devices, cracks, scratches, or gouges in the electronic display can reduce the grade and value of a refurbished mobile device.

Conventionally, removing defects from glass materials involve the following characteristics: (1) processes are manual or semi-automated but not automated, (2) defect removal is restricted to exposed surfaces, (3) internal defects located within a glass body cannot be removed or changed, (4) defect removal processes involve wet chemical techniques where solvents and etchants are used, and (5) defect removal processes involve the use of polishing compounds and mechanical polishing equipment.

SUMMARY

To overcome the problems described above, embodiments of the present disclosure use laser power to anneal, melt and reflow glass in a localized area to eliminate relief edges and surfaces that reflect visible light that are noticed as defects in/on the glass. This disclosure describes instrumentation and methods to remove ('laser healing') scratches, pits, chips, spalls,—or other visible types of defects—from the surface or interior regions of mobile devices and glass display materials of other devices. It is known that glass strongly absorbs light in the far infrared region of the electromagnetic spectrum beginning at a wavelength of approximately 3 microns. Thus, it is proposed that laser wavelengths of nominally 9.3 microns, 10.3 microns, and 10.6 microns—such as that emitted from a $CO_2$ laser—are used to remove or 'laser heal' damaged regions of glass materials.

The disclosure involves a dry, ambient temperature, automated process wherein a laser is focused above the surface of a glass structure, at the surface of a glass structure, or within the body of a glass structure in order to remove defects that are observed to reside on the surface or within the body of said glass structure. The disclosed process proceeds through a mechanism of glass annealing, glass melting, or a combination of both. As such, the disclosed defect removal method is referred to as 'laser healing'.

Although described with respect to healing defects in glass of electronic displays in mobile devices, the systems and methods described in this disclosure can be used to heal defects in other glass articles such as eyeglasses, watches, jewelry, clocks, lenses, and instrumentation, for example.

In an embodiment, a system to remove defects from a glass article, comprises a laser that outputs a fan-shaped infrared beam; and a mechanism to move the glass article relative to the laser while the laser irradiates the glass article and melts a portion of the glass article irradiated by the laser.

The system can further include a computer that controls operation of the laser and the mechanism.

In an aspect, the mechanism is a linear stage on which the glass article is located.

In an aspect, the laser includes a zinc-selenide objective lens that defines the fan-shaped infrared beam.

In an aspect, a wavelength of the laser is within a range of 10.55-10.63 microns.

In an aspect, the laser is pulse width modulated.

In an aspect, the laser has an output power in a range of about 20-70 W.

The system can further include a vision system that controls movement of the mechanism.

In another embodiment, method for removing defects from a glass article incudes positioning the glass article relative to a laser emitting a fan-shaped infrared beam; irradiating the glass article by the laser; and moving the glass article and the laser relative to each other to melt and anneal a portion of the glass article irradiated by the laser.

In an aspect, moving the glass article and the laser relative to each other includes moving the glass article on a linear translation stage.

In an aspect, the irradiating the glass article by the laser and moving the glass article and the laser relative to each other are computer controlled.

In another embodiment, a non-transitory, machine-readable medium having stored thereon a plurality of executable instructions, that when executed by a processor, the plurality of instructions comprises instructions to: irradiate a glass article by a laser; and move the glass article and the laser relative to each other to melt and anneal a portion of the glass article irradiated by the laser.

In an aspect, moving the glass article and the laser relative to each other includes moving the glass article on a linear translation stage.

The above and other features, elements, characteristics, steps, and advantages of the present invention will become more apparent from the following detailed description of preferred embodiments of the present invention with reference to the attached drawings.

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

It is known that glass strongly absorbs light in the far infrared region of the electromagnetic spectrum beginning at a wavelength of approximately 3 microns. Thus, it is proposed that laser wavelengths of nominally 9.3 microns, 10.3 microns, and 10.6 microns—such as that emitted from a $CO_2$ laser—are used to minimize, remove, or 'laser heal' damaged regions of glass materials.

This disclosure describes a room ambient automated process wherein a laser is focused above the surface of a glass structure, at the surface of a glass structure, or within the body of a glass structure in order to remove defects that are observed to reside on the surface or within the body of the glass structure. While not intending to limit the disclosure in any way, it is generally thought that the disclosed process proceeds through a mechanism of glass annealing, glass melting, or a combination of both. As such, the disclosed defect removal method is referred to as 'healing'. A laser is used to heat an area of the glass structure to softening the area at a depth for a period of time. Softening the glass in an area of a defect allows the glass to reflow in that area and fill-in or planarize the defect such that it becomes invisible or less noticeable.

Figure 1:
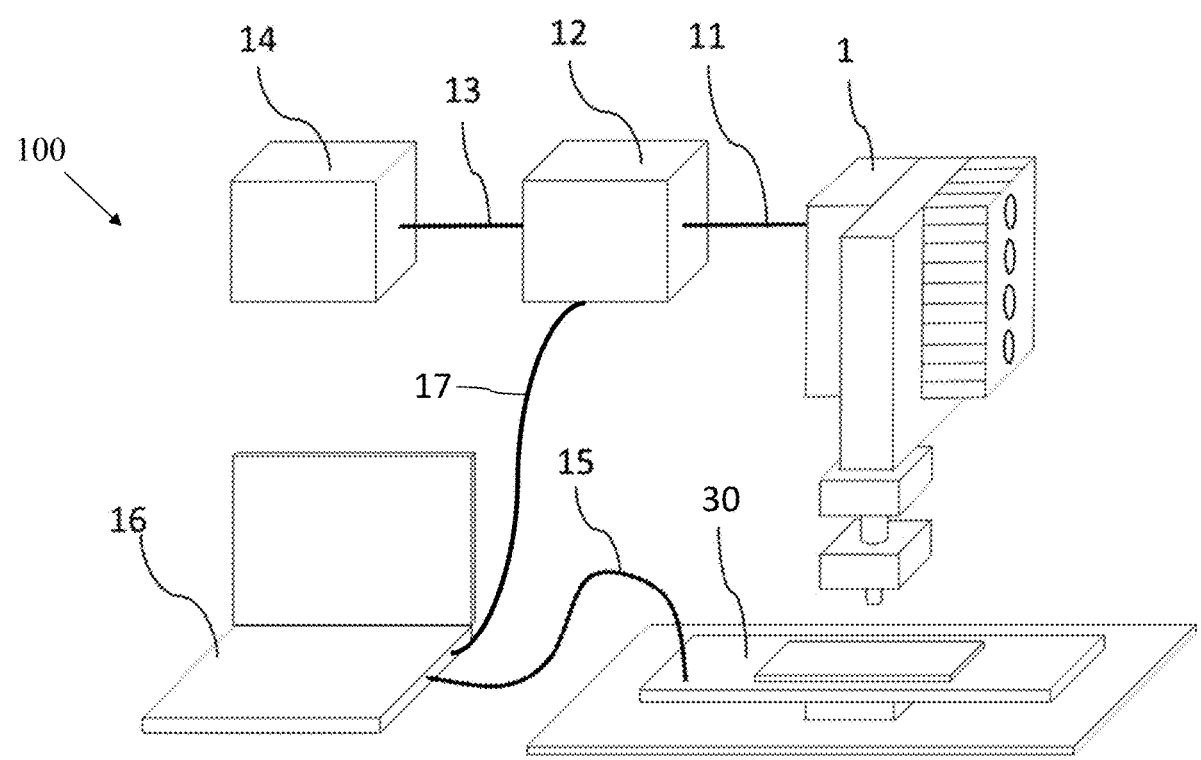
FIG. 1 is a diagram illustrating a glass healing system for removing defects from glass materials with laser irradiation according to an embodiment of the present disclosure.

FIG. 1 is a diagram illustrating a glass healing system 100 for removing defects from glass materials with laser irradiation according to an embodiment of the present disclosure. As shown, the glass healing system 100 can include a laser assembly 1, a laser controller 12, and a stage system 30. The laser controller 12 and the stage system 30 can be controlled by a computer 16. Optionally, the glass healing system 100 can include an oscilloscope 14 connected to the laser controller 12.

FIG. 1 also shows communication cables connecting various components of the glass healing system 100. FIG. 1 shows a laser cable 11 connecting the laser controller 12 to the laser assembly 1, a scope cable 13 connecting the oscilloscope 14 to the laser controller 12, a stage cable 15 connecting the computer 16 to the stage system 30, and a control cable 17 connecting the computer 16 to the laser controller 12. The cables shown provide a communication path between the corresponding components. The communications between components can include power, control commands, sensor signals, data, and the like. The cables shown can be wire or optical fiber in any suitable configuration necessary to perform transmission of signals between components of the glass healing system 100. Although indicated as one cable by a reference number, an interface between components in the glass healing system 100 can include more than one physical cable. Optionally, a cable connecting two components within the glass healing system 100 can be omitted and replaced by a wireless and/or a near-field wireless communication technology such as Zigbee, Wi-Fi, Bluetooth®, radio, wireless local area network (WLAN), and the like.

Figure 2:
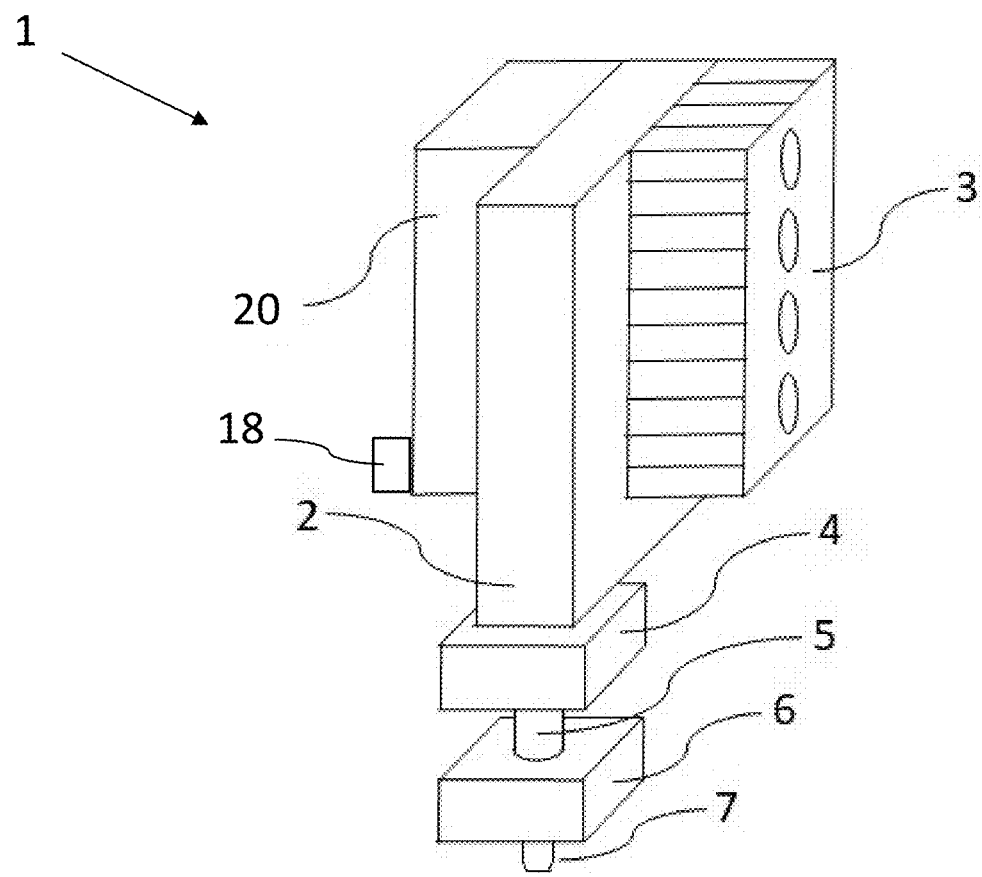
FIG. 2 is a diagram of a laser assembly.

FIG. 2 is a diagram illustrating the laser assembly 1. The laser assembly 1 can include an electronics module 20, a laser head 2, a cooling fan 3 to cool the laser head 2 and/or the electronics module 20, and an optical assembly. Optionally, the laser assembly 1 can include a depth sensor 18 that can be used to determine a distance between a reference point on the laser assembly 1 and a surface of the mobile device 8. The electronics module 20 can provide power to the laser head 2. The laser head 2 can include a $CO_2$ laser. The optical assembly for the laser head 2 can include an adapter 4 to mechanically adapt optical components to the laser head 2. The optical components can include a beam tube 5, a focusing objective adapter 6, and a focusing objective 7. Although not required, the beam tube 5 and the focusing objective adapter 6 can be included to optimize the optical path and focal distance of the laser beam and provide an interface for a custom focusing objective 7. For example, the focusing objective 7 can be a zinc selenide infrared lens. The focusing objective 7 can be configured to irradiate a circular or oval spot. Alternatively, the focusing objective 7 can be configured as a diverging lens such that the infrared radiation emitted by the laser head 2 and input to the focusing objective 7 is spread out or diverged by the focusing objective 7 into a substantially triangular or fan shaped pattern resulting in a substantially rectangular or wide-oval shaped irradiation pattern. This lens configuration spreads out the power of the laser radiation to provide a wider output of a line of radiation rather than a point or spot of radiation typically output from a laser. The line of laser power creates a curtain of radiation in which the mobile device is passed and used to heal glass defects by, e.g., softening and annealing.

As shown, the glass healing system 100 with the laser assembly 1 can include a laser electronics module 20 and a laser head 2. Combined, the laser electronic module 30 and the laser head 2 can have an output at a power and power density at any suitable level that will soften the material being healed. The output power can be in a range of about 20-120 W. The output power can be in a range about 30-50 W. The output power can be about 40±5 W. The output power can be about 120±5 W. The power density can be on the order of 10 E+6 to 10 E+10 W/m². The operating wavelength of the laser head 1 can be within a range of 10.55-10.63 microns. The output of the laser head 2 can be continuous wave or pulse width modulated.

Figure 3:
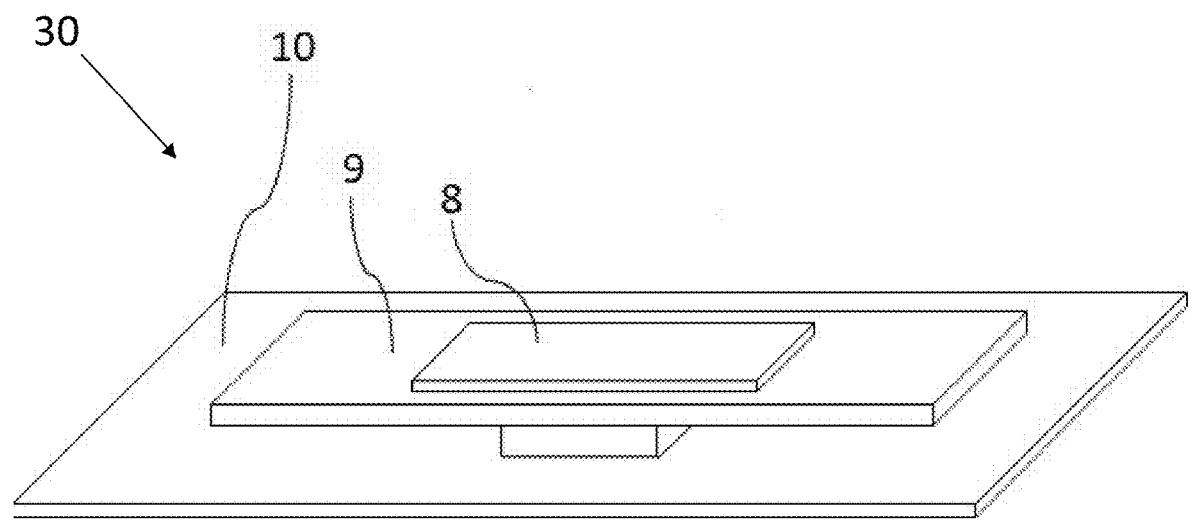
FIG. 3 is a diagram of a stage system of the glass healing system.

FIG. 3 is a diagram illustrating the stage system 30 of the glass healing system 100. The stage system 30 can include a translation stage 9 and a tabletop 10. The translation stage 9 can be a linear stage and configured to move in X and Y directions substantially parallel to a top surface of the translation stage 9. Linear movement of the translation stage 9 can be provided manually or be motorized and controlled by the computer 16. The tabletop 10 can be configured to move up and down in the Z direction so as to move the mobile device 8 closer to or farther away from the objective lens 7. Data from the depth sensor 18 can be used to control the distance from the objective lens 7 to the mobile device based on the focal length of the objective lens 7. Similar to the X-Y linear translation stage 9, the tabletop 10 can be moved manually or be motorized and controlled by the computer 16. An article of a mobile device 8 is also shown in place on the stage system 30. The translation stage 9 and the tabletop 10 can be used to align and move the mobile device 8 relative to the output beam of the laser head 2. Optionally, X, Y, and Z movement of the article with respect to the objective lens 7 can be integrated and provided by one translation stage. Optionally, a translation stage can also provide angular rotation. The translation stage 9 and the tabletop 10 can be motorized and controlled by the computer 16 running an application program and communicating with the stage system 30 via control cable 15 or wirelessly. While FIGS. 1 and/or 3 and the above description reference a generally horizontal arrangement for stage system 30, it will be understood by those of skill in the art that other orientations for stage system 30 (e.g., a vertical arrangement for stage system 30, a tilted arrangement for stage system 30, etc.) are contemplated and within the scope of this disclosure.

Referring to FIG. 1, the laser controller 12 can provide power and duty cycle control to the laser assembly 1. Optionally, the laser controller 12 can be integrated with the laser assembly 1. The oscilloscope 14 can optionally be used as a diagnostic tool to set-up and/or monitor the duty cycle and pulse width modulation control being provided by the laser controller 12.

The computer 16 can provide user control to the laser controller 12 and the stage assembly 30. The computer 16 can be a personal computer, a single board computer, a central processing unit, or the like. Optionally, the computer 16 can be decentralized such as a network of computers. Computer control can be provided by an application or applications that interface to the laser controller 12 and the stage assembly 30. The application can be a software program stored on a memory that is in communication with the computer 16. The memory can be integrated with the computer 16 or decentralized as part of a network or cloud storage. The computer 16 running an application can send commands to the laser controller 12 to control the duty cycle of the laser output. The application can send commands to the stage assembly 30 to control movement or positioning of the translation stage 9, the tabletop 10, and consequently, the mobile device 8 in place on the stage assembly 30. A user interface can be provided via a graphic user interface (GUI) on the computer 16 to permit a user to set operational parameters such as laser duty cycle, distance between the laser and the mobile device, and movement of the translation stage to control the glass healing system 100.

Figure 4:
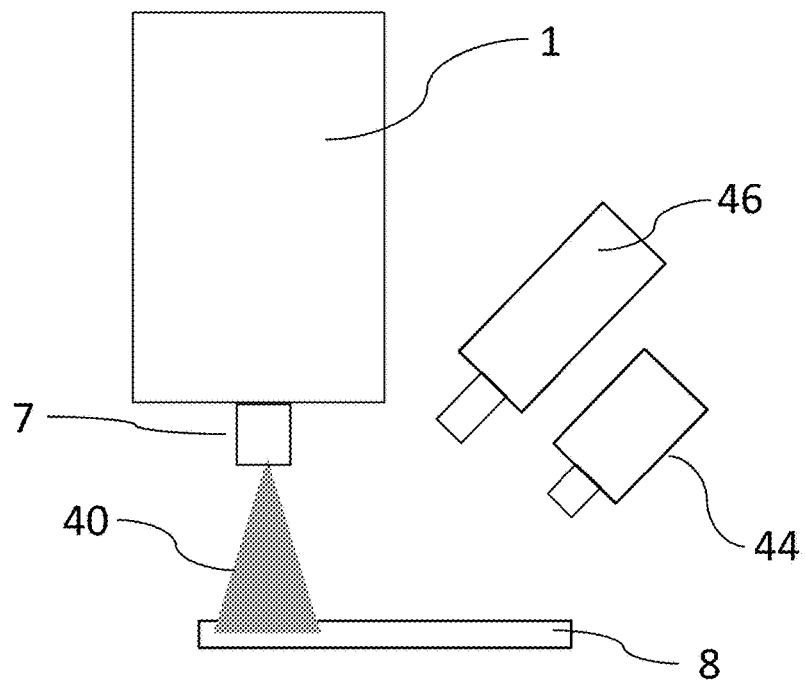
FIG. 4 is a schematic illustrating healing of glass defects of a mobile device.

As shown in FIG. 4, the glass healing system 100 can include a vision system 44. Such a vision system 44 can include a digital camera or sensor and be interfaced to the computer 16 and be used to remotely monitor the laser healing process, capture image data of the mobile device 8 before and after laser healing takes place, and/or for any other quality control, training, or recording functions. Additionally, the vision system 44 can be used to identify portions of the mobile device 8 that require healing. Such information can be used to control the glass healing system 100 to heal only those areas that need to be healed. The vision system 44 can also be used to inspect portions after healing to verify the healing process was satisfactory. The vision system 44 can be operated manually or use machine learning or artificial intelligence to identify where healing should take place, guide movement of the mobile device 8 via the translation stage 9, 10 with respect to the laser assembly 1 with real-time feedback, and inspect the healing results.

As shown in FIG. 4, the glass healing system 100 can include a thermal camera system 46. The thermal camera system 46 can include a sensor sensitive to thermal radiation in the infrared and be interfaced to the computer 16 and be used to monitor the laser healing process by tracking temperature of the mobile device 8 as it is being irradiated by the laser assembly 1. Such temperature information can be used to provide feedback and control the glass healing system 100 to apply the laser irradiation at desired areas for a time required to heal defects. For example, the thermal camera system 46 can be an Optris PI 640i G7 Thermal IR Camera.

FIG. 4 is a schematic illustrating healing of glass defects of the mobile device 8. The front surface of the mobile device 8 (i.e., the front surface of the electronic display) is oriented to be substantially normal to the radiation output of the laser assembly 1. FIG. 4 shows the laser assembly 1 emitting a fan-shaped radiation beam 40 through the objective lens 7 (other optional lens components and adapters shown in FIGS. 1 and 2 are omitted for brevity) and irradiating a front surface of the mobile device 8. The fan-shaped radiation beam is an irradiation pattern that is longer than it is wide. The mobile device 8 can be moved with respect to the radiation beam 40 in such a way that the laser assembly 1 can irradiate only a portion of or the entire electronic display of the mobile device 8. For example, an application can be run by the computer 16 to move or raster the translation stage 9 and/or the tabletop 10 with the mobile device 8 in place while the laser assembly 1 is irradiating the mobile device 8. Speed of the movement of the mobile device 8 can be optimized to provide a dwell time such that the display glass of the mobile device is properly treated without damaging the display electronics.

The laser assembly 1 can pulse output the radiation beam 40 having a wavelength range within 10.55-10.63 microns at an optical power of about 40 W at less than full duty cycle. The duty cycle of the radiation beam 40 can be adjusted to prevent over penetration of the irradiation to not damage materials and structures that define pixels and electronics of the electronic display. For example, the duty cycle can be 50 ms on and 2000 ms off. The objective lens 7 can diverge the beam out from the laser to spread the output optical power across the fan shaped radiation beam 40 to minimize heating stress of the glass at any one localized point. The distance between the objective lens 7 and the mobile device 8 can be predetermined based on the focal length of the objective lens to optimize focus of the radiation beam 40 to be at the surface of the glass or within the thickness of the glass.

When a laser irradiates a glass, a portion of the laser energy is absorbed and conducted by the glass. If the laser energy absorbed by the glass is high enough, the temperature of the glass can be increased enough to anneal, soften, or melt the glass. Glass heated by a laser to the melting temperature can boil the glass causing the glass to vaporize or eject molecules from the irradiation site which can undesirably land, cool, and build up outside the irradiation site. For the purposes of healing glass defects, it is advantageous to heat glass in the area of the defects at least to the softening point so that the glass in the area of the defect can begin to flow but not overheat the glass to the point it vaporizes or displaces. Mathematical models have been developed for processing materials irradiated by lasers. One model described by Shen et al. provides correlation between melt depth, laser power density, and laser irradiation time. See, Z. H. Shen et al., *Mathematical modeling of laser induced heating and melting in solids*, Optics & Laser Technology, 533-537 (2001), which is incorporated in its entirety by reference.

Shen teaches that the time for the surface of the irradiated material to reach the melting point $t_m$ (sec) can be calculated as follows using equation (1):

$$t_m = \frac{(T_m - T_0)^2 c_s \rho_s k_s}{2(A_s I)^2},$$

where $c_s$ is the heat capacity of solid (J/kg K), $\rho_s$ is the density of solid (kg/m$^3$), $k_s$ is the thermal conductivity of solid (W/m K), and $A_s$ is the absorptivity of the solid (%).

Additionally, by knowing thermophysical properties of a material to be irradiated and laser power density, a melting depth S(t) (m) can be calculated as follows using equation (2):

$$S(t) = \frac{k_\ell}{A_\ell I}\left[\frac{2\lambda_\ell A_\ell^2 I^2}{k_\ell^2}t + C_0\right]^{1/2} \ln\frac{\left[2\lambda_\ell A_\ell^2 I^2 t/k_\ell^2 + C_0\right]^{1/2}}{T_m},$$

where $k_\ell$ is the thermal conductivity of liquid (W/m K), $\lambda_\ell$ is the thermal diffusivity of liquid (m$^2$/sec), $A_\ell$ is the absorptivity of liquid (%), 1 is the laser power density (W/m$^2$), t is $t_m$ (sec) from equation (1), $T_m$ is the melting point (K),
where $$C_0 = T_m^2 - \frac{\lambda_\ell k_s^2 A_\ell^2}{\lambda_s k_\ell^2 A_s^2}(T_m - T_0)^2,$$

and
where $T_0$ is the ambient temperature.

By using such a model, the depth of melting in the material where the healing occurs and the time in which the laser needs to irradiate the area to be healed can be determined and used to select or adjust laser and movement parameters for the application.

Figure 5:
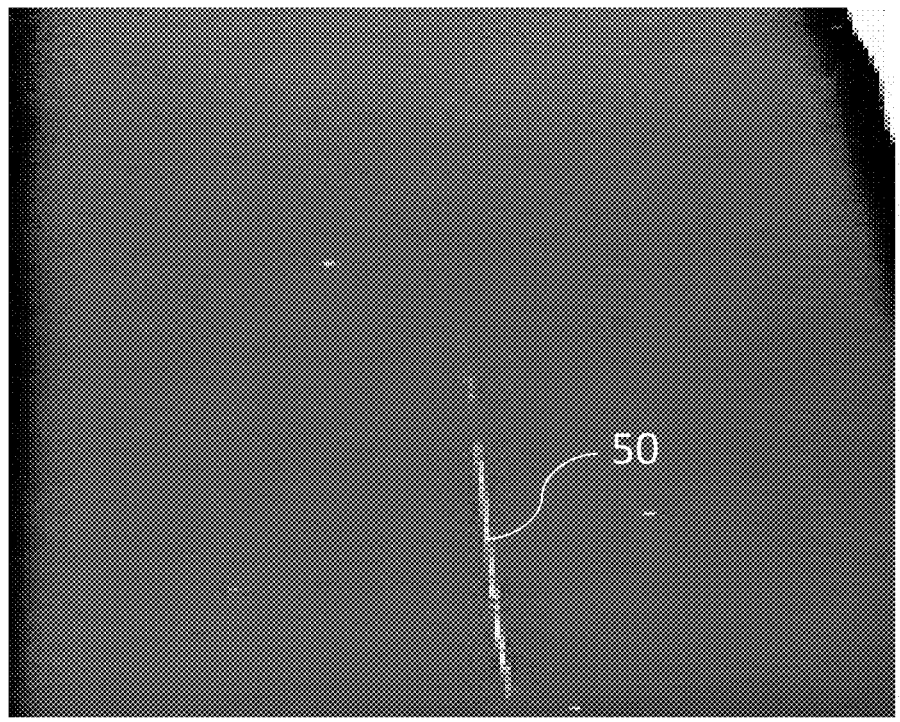
FIG. 5 is an image of a display in a smartphone before laser treatment.
Figure 6:
FIG. 6 is an image of a display in a smartphone after laser treatment.

As an example, FIG. 5 is an image of a display in a smartphone before laser treatment showing the presence of a single scratch 50 on the outermost glass surface of the display. FIG. 6 is an image of the display in FIG. 5 after laser treatment according to embodiments described herein and showing absence of the scratch shown in FIG. 5. The scratch 50 shown in FIG. 5 has been healed using laser power to, e.g., melt and anneal the glass in the area of the scratch to dull the boundaries of and/or fill in the depth of the scratch.

Figure 7:
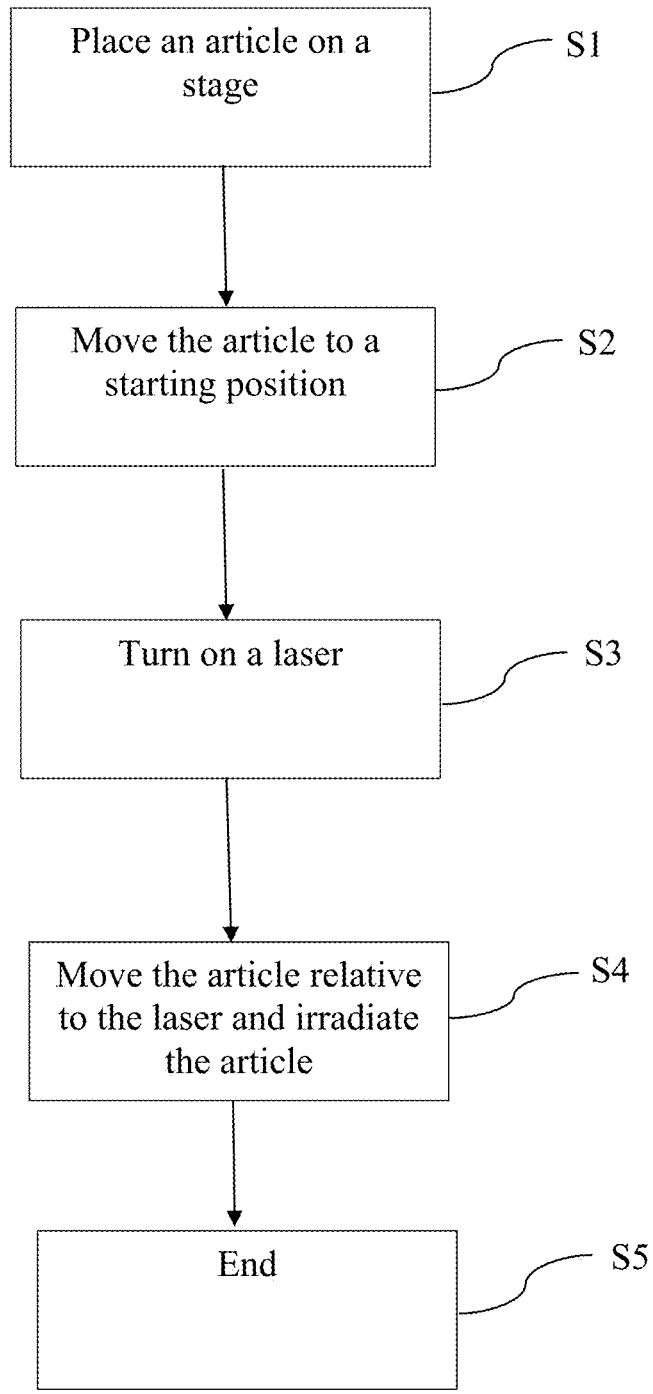
FIG. 7 is a flowchart of a method for removing defects from glass materials with laser irradiation according to an embodiment of the present disclosure.

FIG. 7 is a flowchart of steps of a method for removing defects from glass materials with laser irradiation according to an embodiment of the present disclosure. The method can be performed using the glass healing system 100.

In step S1, an article containing a damaged glass surface is placed on a stage. The article can be a mobile device and the glass surface can be of an electronic display of the mobile device. The stage can be a moveable stage where movement of the stage can be motorized. The stage can be interfaced to a computer that controls movement of the stage where the movement can be preprogrammed based on the stage geometry and the particular model of the mobile device. When placed on the stage, the article can be at a starting point. Optionally, the article can be moved to a starting point in step S2.

In step S2, the stage can be moved to locate the article in a starting position. The starting position can be predetermined based on the geometry of the stage, the position of the article placed on the stage, and the position of a laser pointing at the stage. The starting position can also take into account a location of any defects on the article's glass surface and the focal distance of the laser to the glass surface. Optionally, the stage can be at the starting position when the article is place on it.

In step S3, the laser can be turned on or otherwise configured to output radiation. This can be performed manually or automated. For example, the laser can be controlled by a computer. For the laser, the output wavelength, the output power, the pulse width modulation, the focal distance, the radiation pattern, and the irradiation time can be predetermined and configured for the article being repaired.

In an embodiment, the radiation pattern is a fan shape, for example, from a diverging objective lens on the laser that irradiates a line of the radiation onto the glass surface of the article. If the stage in which the article is place is not moveable, then the laser can be moved relative to the article. For example, the laser can be positioned in an arm, a gantry, or any other suitable mechanism that can move the laser so that it's radiation pattern can irradiate defects on the glass surface and/or the entire glass surface.

In step S4, the article and the laser are moved relative to each other to irradiate the article with radiation output from the laser. In one aspect, the laser is stationary and the stage in which the article is placed is moved. In another aspect, the stage is stationary and the laser is moved. The time to heal a particular area of the article by irradiating the area can be a function of the laser beam on-time of the duty cycle and speed of movement of the article with respect to the laser beam. The relative movement can be performed manually or motorized. Motorized movement can be preprogrammed and performed under control of a computer that is in communication with a motor or drive mechanism that moves the stage or the laser. The article and the laser can be moved relative to each other such that the laser irradiates the entire glass surface under the preselected laser conditions. In one aspect, the relative movement is such that the laser radiation is rastered in which the entire glass surface area is scanned from side to side and from top to bottom or by step and repeating. Optionally, the article and the laser can be moved relative to each other such that the laser irradiates only areas of the glass surface that include defects desired to be repaired.

Once laser irradiation of the article is completed, the method can end in step S5. The stage can be parked, the laser can be turned off or otherwise configured to stop or block the radiation output, and the article removed from the stage.

Example: Following is a theoretical example of using the disclosed method to heal defects in fused quartz glass having thermophysical properties as listed in Table I with a laser having properties as listed in Table II.

TABLE I

| Fused Quartz Property | Symbol | Unit | Value |
| --- | --- | --- | --- |
| Density of Solid | $\rho_s$ | kg/m$^3$ | 2650 |
| Density of Liquid | $\rho_l$ | kg/m$^3$ | 2350 |
| Latent Heat of Fusion | L | J/kg | 146000 |
| Melt Temperature | $T_m$ | K | 1883 |
| Initial/Ambient Temperature | $T_o, T_i$ | K | 298 |
| Vaporization Temperature | $T_v$ | K | 2270 |
| Thermal Conductivity of Solid | $k_s$ | W/m K | 1.67 |
| Thermal Conductivity of Liquid | $k_l$ | W/m K | 2.87 |
| Thermal Diffusivity of Solid | $\alpha_s$ | m$^2$/sec | 7.300E−07 |
| Thermal Diffusivity of Liquid | $\alpha_l$ | m$^2$/sec | 1.415E−06 |
| Heat Capacity of Solid | $C_{ps}$ | J/kg K | 863 |
| Heat Capacity of Liquid | $C_{pl}$ | J/kg K | 1150 |
| Absorptivity | A | %/100 | 0.60 |
| Emissivity | ε | unitless | 0.88 |

TABLE II

| Laser Property | Symbol | Unit | Value |
|---|---|---|---|
| Power | — | W | 40 |
| Spot Size | — | m² | 5.153E−09 |
| Power Density | I | W/m² | 7.762E+09 |
| Wavelength | λ | μ | 10.6 |

Applying formulas (1) and (2) to a case of heating fused quartz glass using a laser having properties shown in Table II indicates that it will take 0.318 micro-seconds to melt the glass at a depth of 0.3217μ.

The above-described embodiments of the present disclosure can be implemented in any of numerous ways. For example, the embodiments can be implemented using hardware, software, or a combination thereof. When implemented in software, the software code can be executed on any suitable computer, processor, or collection of processors, whether provided in a single computer or distributed among multiple computers. Such processors can be implemented as integrated circuits, with one or more processors in an integrated circuit component. Though, a processor can be implemented using circuitry in any suitable format.

Additionally, or alternatively, the above-described embodiments can be implemented as a non-transitory computer readable storage medium embodied thereon a program executable by a processor that performs a method of various embodiments.

Also, the various methods or processes outlined herein can be coded as software that is executable on one or more processors that employ any one of a variety of operating systems or platforms. Additionally, such software can be written using any of a number of suitable programming languages and/or programming or scripting tools, and also can be compiled as executable machine language code or intermediate code that is executed on a framework or virtual machine. Typically, the functionality of the program modules can be combined or distributed as desired in various embodiments.

Also, the embodiments of the present disclosure can be embodied as a method, of which an example has been provided. The acts performed as part of the method can be ordered in any suitable way. Accordingly, embodiments can be constructed in which acts are performed in an order different than illustrated, which can include performing some acts concurrently, even though shown as sequential acts in illustrative embodiments.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A method for removing defects from a glass article of a mobile device electronic display, comprising:
   positioning a mobile device electronic display comprising a glass article relative to a laser emitting a fan-shaped infrared beam;
   irradiating the glass article of the mobile device electronic display by the laser;
   cycling the laser between on and off in order to control heat generation and penetration to prevent damage to the electronic display; and
   moving the glass article and the laser relative to each other to melt and anneal a portion of the glass article irradiated by the laser.

2. The method of claim 1, wherein moving the glass article of the mobile device electronic display and the laser relative to each other includes moving the glass article on a linear translation stage.

3. The method of claim 1, wherein a wavelength of the laser is within a range of 10.55-10.63 microns.

4. The method of claim 1, wherein the laser is pulse width modulated.

5. The method of claim 1, wherein the irradiating the glass article of the mobile device electronic display by the laser and moving the glass article of the mobile device electronic display and the laser relative to each other are computer controlled.

6. The method of claim 1 further comprising:
   taking at least one image of the glass article of the mobile device electronic display using a vision system.

7. The method of claim 6 further comprising: determining, using the at least one image of the glass article of the mobile device electronic display, where to conduct the irradiating.

8. The method of claim 6 further comprising: verifying, using the at least one image of the glass article of the mobile device electronic display, to verify the irritating step healed the glass.

9. The method of claim 1, wherein the laser is configured to have a power value of 40 W, a spot size of 5.153E-9 m², a power density of 7.762E9 W/m², and a wavelength of 10.6μ.

* * * * *